(12) United States Patent
Duncan

(10) Patent No.: US 6,987,404 B2
(45) Date of Patent: Jan. 17, 2006

(54) SYNCHRONIZER APPARATUS FOR SYNCHRONIZING DATA FROM ONE CLOCK DOMAIN TO ANOTHER CLOCK DOMAIN

(75) Inventor: Richard L. Duncan, Bedford, TX (US)

(73) Assignee: VIA Technologies, Inc., Fremont, CA (US)

( * ) Notice: Subject to any disclaimer, the term of this patent is extended or adjusted under 35 U.S.C. 154(b) by 0 days.

(21) Appl. No.: 10/684,093

(22) Filed: Oct. 10, 2003

(65) Prior Publication Data

US 2005/0077932 A1  Apr. 14, 2005

(51) Int. Cl.
H03K 5/135 (2006.01)
(52) U.S. Cl. ...................... 327/141; 327/144; 375/356
(58) Field of Classification Search ................ 327/141, 327/142, 144, 145, 293, 298; 711/167–8; 713/400; 375/355, 356

See application file for complete search history.

(56) References Cited

U.S. PATENT DOCUMENTS

| | | | | |
|---|---|---|---|---|
| 5,857,005 A | * | 1/1999 | Buckenmaier | 375/357 |
| 5,923,193 A | * | 7/1999 | Bloch et al. | 327/141 |
| 6,000,022 A | * | 12/1999 | Manning | 711/167 |
| 6,049,887 A | * | 4/2000 | Khandekar et al. | 713/503 |
| 6,115,763 A | | 9/2000 | Douskey et al. | 710/72 |
| 6,138,246 A | | 10/2000 | Petty | 713/500 |
| 6,345,328 B1 | * | 2/2002 | Rozario et al. | 710/52 |

* cited by examiner

Primary Examiner—Timothy P. Callahan
Assistant Examiner—An T. Luu
(74) Attorney, Agent, or Firm—Preston Gates & Ellis LLP

(57) ABSTRACT

An improved signal synchronizing circuit for prohibiting signals traveling from a first clock domain operating with a first clock to a second clock domain operating with a second clock when the first clock is not active. The synchronizing circuit comprising at least one signal receiving module for receiving at least one selected signal in the first clock domain, a detection circuit producing a detection signal indicating that the first clock is active, and at least one output selection module for passing the selected signal from the first clock domain to the second clock domain when the first clock is active.

28 Claims, 9 Drawing Sheets

SYNCHRONIZER APPARATUS FOR SYNCHRONIZING DATA FROM ONE CLOCK DOMAIN TO ANOTHER CLOCK DOMAIN

BACKGROUND

The present disclosure relates generally to computer processor design, and more specifically to a method and system for synchronizing signals traveling between a plurality of clock domains.

In an electronic system, it is common to have various sections of synchronous logic circuits operating with different clocks, which are usually not synchronized with each other. Each area of a circuit operated according to a local clock, unsynchronized with other local clocks. Often it is necessary to pass data between different clock domains. A common method for synchronizing data is to use a double-buffer circuit, which uses two flip-flops. A first flip-flop clocks an input signal in sync with a first clock in a first clock domain (or a first time domain), and a second flip-flop clocks the output of the first flip-flop in sync with a second clock in a second clock domain.

Not all clock domains are constantly active. For example, if the first clock domain is not active, then the second flip-flop will not need to be active. For instance, if the first clock domain has a controller centric circuit which is used to support external debugging, the signal coming out from the first clock domain does not need to be active all the time. However, under normal conditions, the second flip-flop continues to be active and will unnecessarily consume energy. This is extremely wasteful in view of the fact that there are usually a large number of flip-flops in the second clock domain that will participate the circuit operation.

Accordingly, there is a need for an improved synchronizing system that is able to detect whether the clock from a clock domain is active, and is able to activate and deactivate certain related circuits depending on the activity of the clock.

SUMMARY

A method and system is disclosed for prohibiting signals traveling from a first clock domain operating with a first clock to a second clock domain operating with a second clock when the first clock is not active. In one example, after receiving at least one signal in the first clock domain, the system detects whether the first clock is inactive. If the first clock is inactive, a detection signal is generated to prohibit the use of the second clock to synchronize signals from the first clock domain, thereby eliminating unnecessary activation of clock driven components such as flip-flops, thereby reducing unnecessary power consumption. A disable circuit is provided to ensure that the system is reset when the first clock becomes inactive.

DESCRIPTION

For the purposes of this disclosure, it is assumed that there are two clock domains in a digital system, each operating in conjunction with a different clock. The clocks may be of different frequencies, and signals may travel both ways between these two clock domains. The present disclosure provides an improved signal synchronizing system that prohibits signals traveling from a first clock domain to a second clock domain to be synchronized with a clock therein when the clock in the first clock domain is not active.

Figure 1:
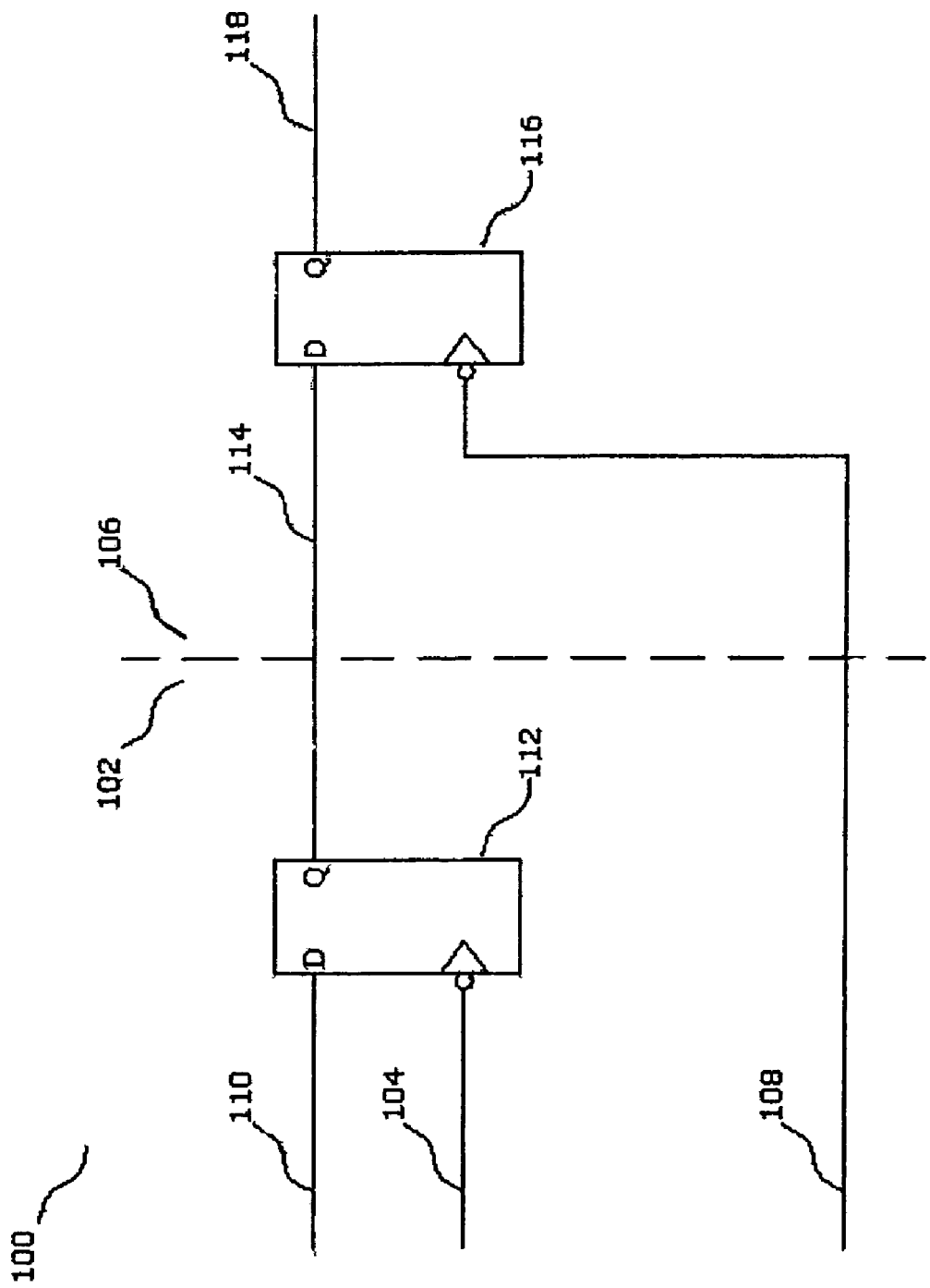
FIG. 1 illustrates a typical dual clock synchronizing circuit.

FIG. 1 illustrates a typical dual clock synchronizing circuit 100, which includes circuitry in a first clock domain 102 synchronized with a first clock signal 104 and circuitry in a second clock domain 106 synchronized with a second clock signal 108. An input signal 110 is clocked with the first clock signal 104 through a first flip-flop/latch 112. The result is an output signal 114, which is then clocked with the second clock signal 108 through a second flip-flop/latch 116. The result is a second output signal 118, which is essentially the input signal 110 clocked from the first clock domain synchronized with the second clock signal. Depending on the circuit design, the first clock signal 104 may or may not be slower than the second clock signal 108. It is further understood, for the purposes of this disclosure, the term "latch" is used interchangeably with the term "flip-flop".

In this design, the second clock signal 108 will continue to drive the flip-flop 116 even if there is no first clock signal 104 in existence. The continuous activation of the second flip-flop 116 consumes power but does not produce meaningful results for signal 118, since the input signal 110 is not clocked with the first clock signal 104 from the first clock domain 102.

Figure 2:
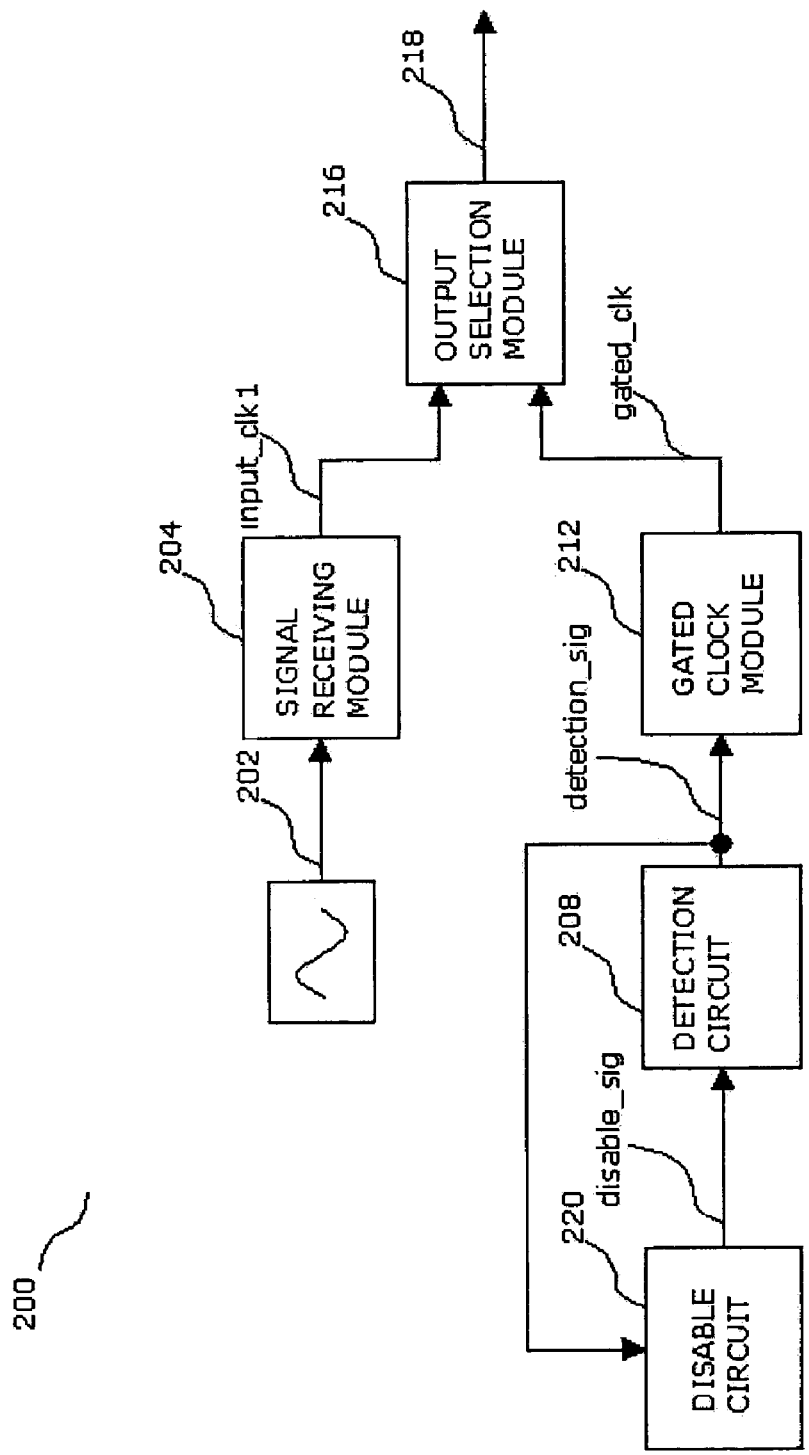
FIG. 2 illustrates a schematic diagram showing components of a clock synchronizing circuit of the present disclosure.

FIG. 2 illustrates a schematic showing components of an improved signal synchronization system 200 according to the present disclosure. The synchronization system 200 has an input signal 202, that is provided to a signal receiving module 204, which receives and subsequently produces a signal input_clk1 clocked with the first clock in the first clock domain. The synchronization system also provides a detection circuit 208, which determines whether or not the first clock domain is active. If the aforesaid clock domain is active, the detection circuit 208 sends a detection signal detection_sig to a gated clock module 212 indicating that the first clock domain is active (e.g., the first clock is active). At this point, the gated clock module 212 sends a gated clock signal gated_clk in a second clock domain to an output selection module 216, which produces a final output signal 218. The output signal 218 is in effect the signal input_clk1 synchronized with the gated clock signal gated_clk. The synchronization system also provides a disable circuit 220, which receives the detection signal detection_sig from the detection circuit 208 and produces a disable signal disable_sig back to the detection circuit 208. The gated clock module, the signal receiving module, and the output selection module may be referred to collectively as a signal synchronization module.

Figure 3:
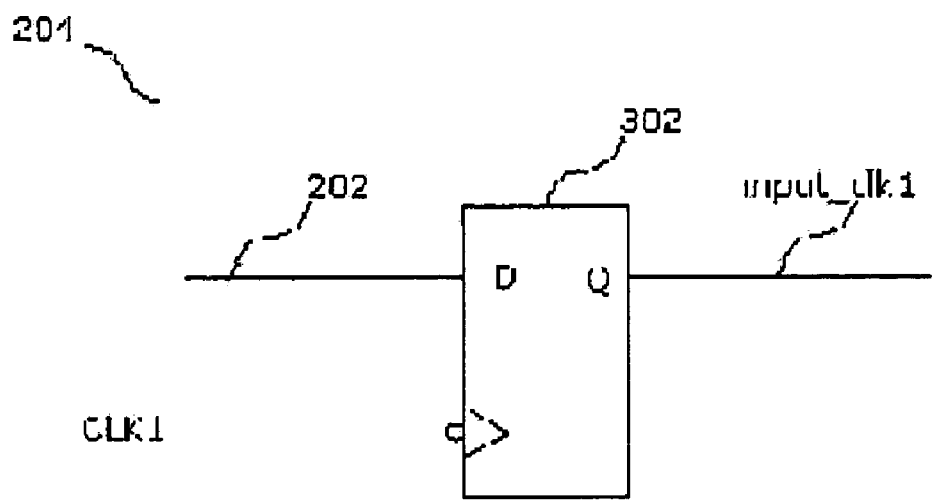
FIG. 3 presents a schematic diagram showing one embodiment of the signal receiving module according to the present disclosure.

FIG. 3 presents a schematic diagram showing one embodiment of the signal receiving module 204. The signal receiving module 204 includes a D flip-flop 302 triggered by the edge of a first clock signal CLK1. Referring to both FIG. 2 and FIG. 3, the signal receiving module 204 receives the input signal 202 and produces the signal input_clk1 clocked with the first clock signal CLK1. Those skilled in the art will understand that a plurality of flip-flops may be present, that other types of flip-flops may be used, and that the flip-flops may be triggered through either a rising or falling edge of the first clock signal CLK1.

Figure 4:
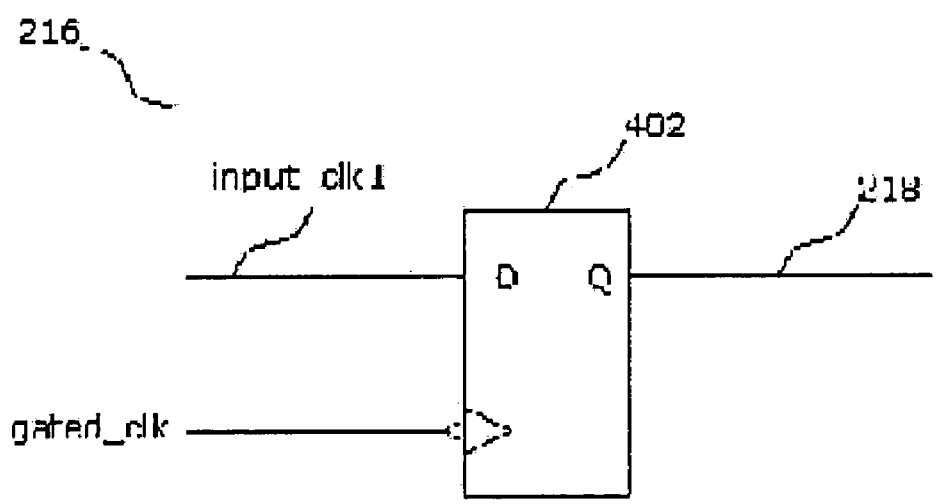
FIG. 4 presents a schematic diagram showing one embodiment of the output selection module according to the present disclosure.

FIG. 4 presents a schematic diagram showing one embodiment of the output selection module 216. The output selection module 216 includes a D flip-flop 402 triggered by the edge of a gated clock signal gated_clk. Referring to both FIG. 2 and FIG. 4, the output selection module 216 receives the signal input_clk1 and produces the output signal 218 clocked with the gated clock signal gated_clk.

Figure 5:
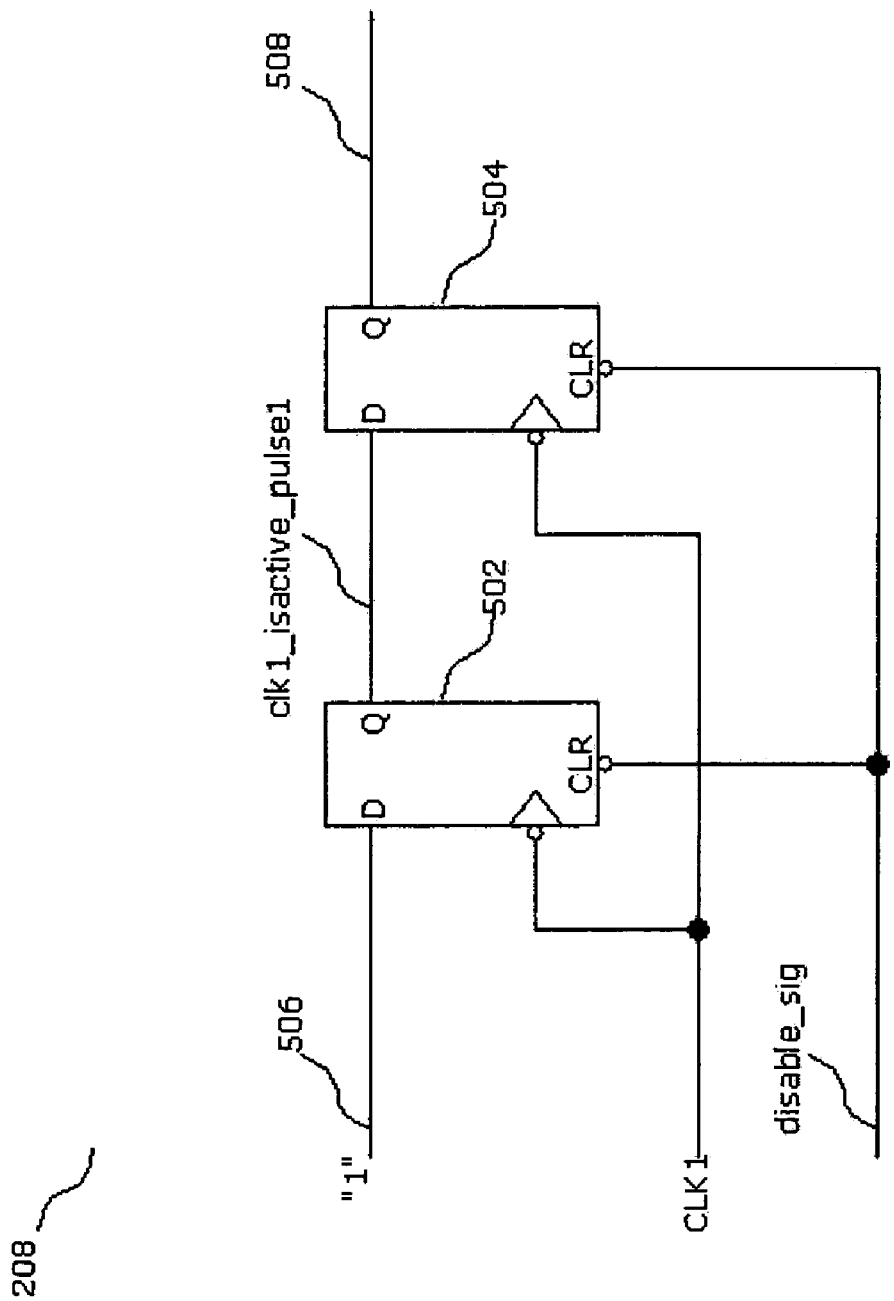
FIG. 5 presents a schematic diagram showing one embodiment of the detection circuit according to the present disclosure.

FIG. 5 presents a schematic diagram showing one embodiment of the detection circuit 208. The detection circuit 208 includes two D flip-flops 502 and 504 connected in series. The flip-flop 502 receives an input signal 506 and is triggered by the edge of a clock signal CLK1. The aforesaid input signal 506 may be set as a constant signal of "1", meaning that, in the logic domain, it is constantly "true" and that, in electronic circuitry, it is constantly active. If the first clock signal CLK1 is active, the flip-flop 502 sends an active signal clk1_isactive_pulsel to the second flip-flop 504, which is also triggered by the edge of the clock signal CLK1. Referring to both FIG. 2 and FIG. 5, if the first clock signal CLK1 is active, the flip-flop 504 sends out the detection signal detection_sig 508 to the gated clock module 212. The detection circuit 208 also receives the disable signal disable_sig from the disable circuit 220. If the disable signal disable_sig is active, both flip-flops 502 and 504 will be cleared, thereby preventing the constantly active input signal 506 from passing directly to the gated clock module 212. It is further noted that anther flip-flop (not shown), which is synchronized with a second clock CLK2, can be put in series with the two flip-flops 502 and 504 in order to stabilize the signal. However, this option can add a delay to the signal propagation toward the gated clock module 212.

Figure 6:
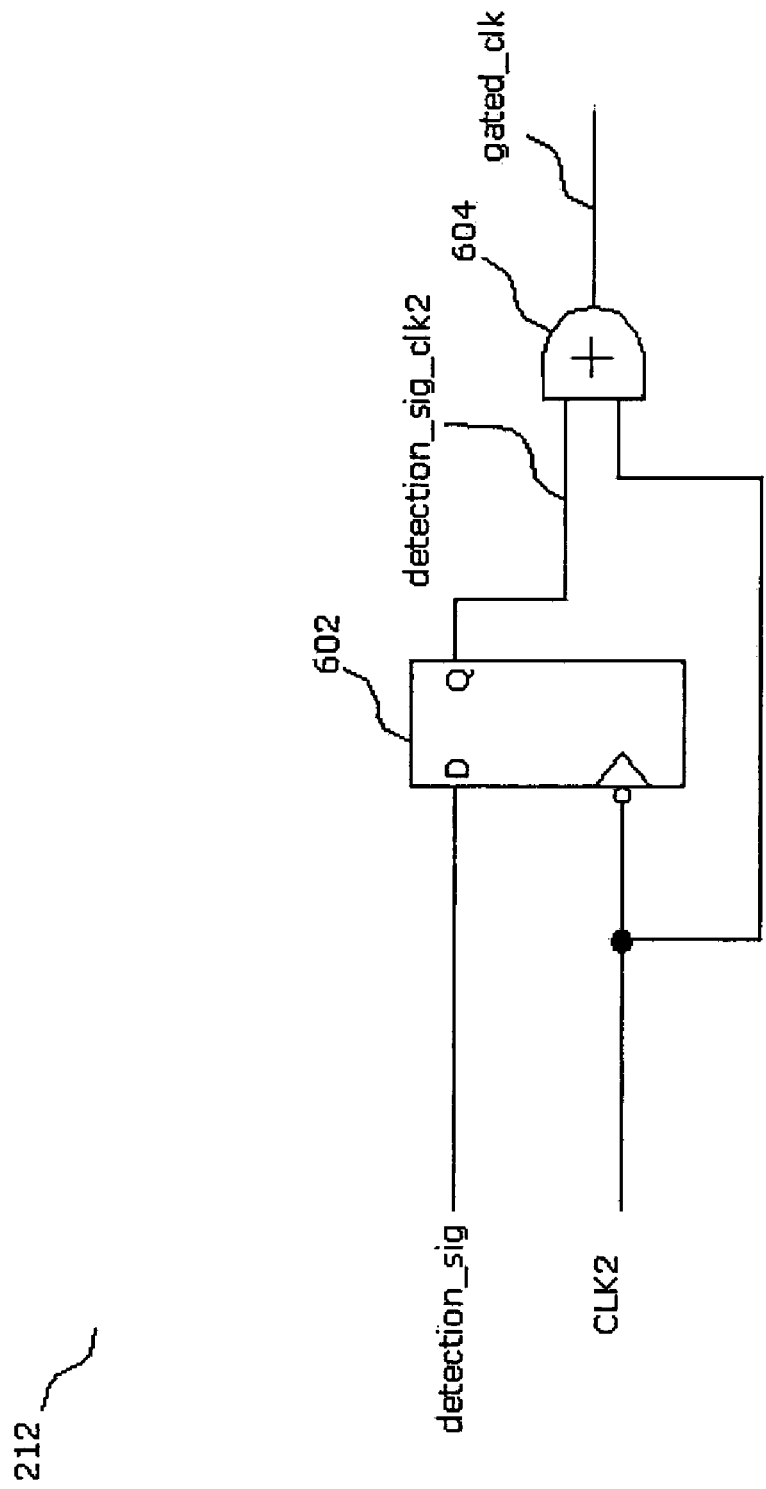
FIG. 6 presents a schematic diagram showing one embodiment of the gated clock module according to the present disclosure.

FIG. 6 presents a schematic diagram showing one embodiment of the gated clock module 212. The gated clock module 212 includes a D flip-flop 602 and a signal passing module such as an AND gate 604. The flip-flop 602 receives the detection signal detection_sig and is triggered through the edge of a second clock signal CLK2. The result is a signal detection_sig_clk2, or the detection signal detection_sig clocked with the clock signal CLK2. The AND gate 604 practically ensures that the gated clock signal gated_clk is sent to the output selection module 216 only if the clock signal CLK1 is active.

Figure 7:
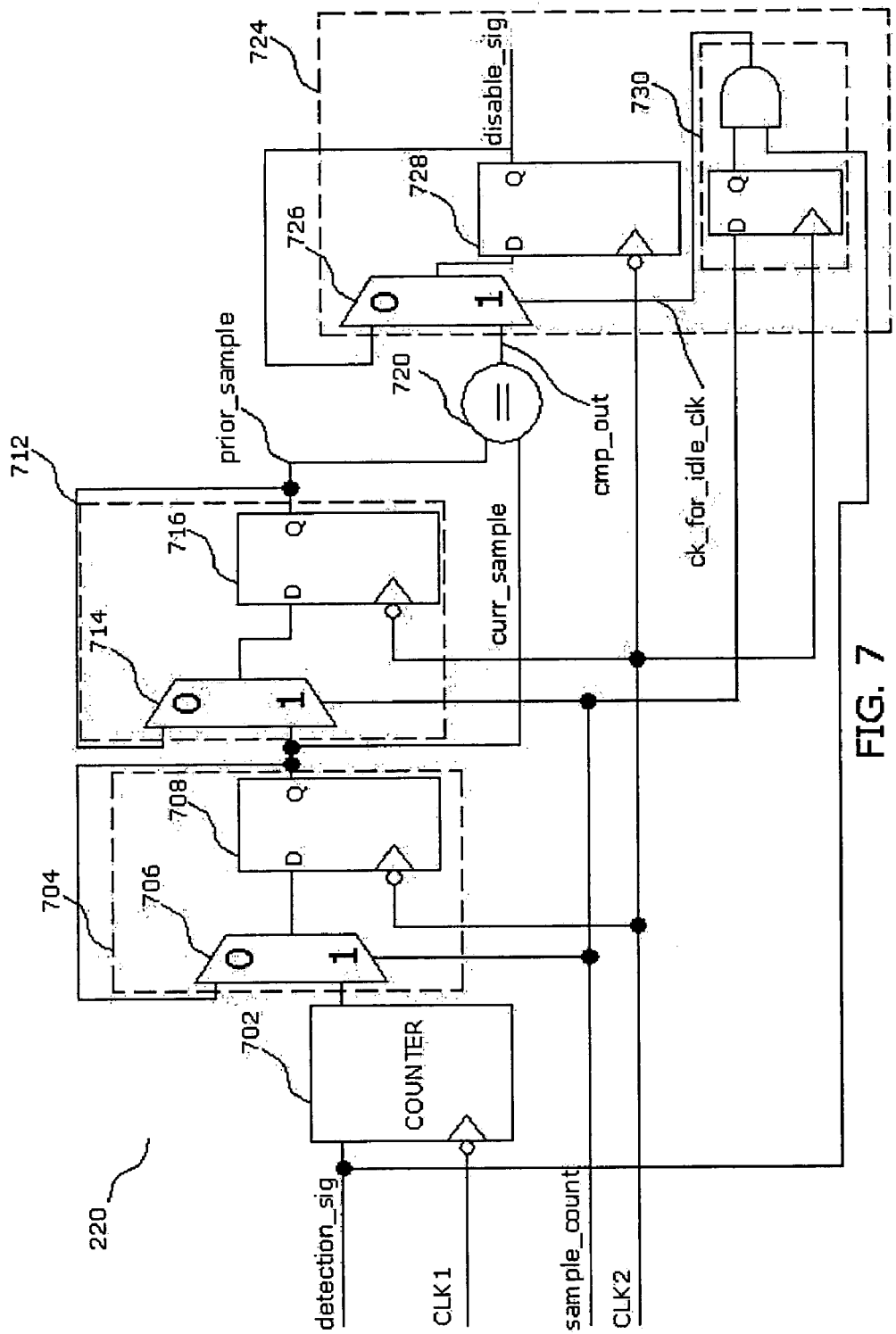
FIG. 7 presents a schematic diagram showing one embodiment of the disable circuit according to the present disclosure.

FIG. 7 presents a schematic diagram showing one embodiment of the disable circuit 220. The disable circuit 220 includes a counter 702, which receives the detection signal detection_sig as its input when triggered by the first clock CLK1 to generate a counter output. The output of the counter 702 is fed into a sample circuit 704, which includes a multiplexer 706 and a D flip-flop 708. The sample circuit 704 generates a current sample signal curr_sample, which is triggered by an external control signal such as a sample counter signal sample_count. The current sample curr_sample is then fed into another sample circuit 712, which includes a multiplexer 714 and a D flip-flop 716. The sample circuit 712 generates a prior sample signal prior_sample, which in effect is a feedback signal in the prior counter sampling cycle. Both the current sample and the prior sample are fed into a comparator 720. Based on curr_sample and prior_sample, the comparator 720 generates an output cmp_out, which is in turn fed into another sample circuit 724. The sample circuit 724 includes a multiplexer 726 and a D flip-flop 728, and generates the disable signal disable_sig. The sample circuits 704 and 712 are triggered concurrently at an appropriate time by the sample_count, and whose outputs, the current sample curr_sample and the prior sample prior_sample, respectively, are compared to prevent the detection circuit 208 from being inadvertently disabled. The sample circuit 724 also includes a check signal generator 730, which in turn includes a flip-flop that synchronizes CLK2 with the sample_count, whose output further feeds into an AND gate with the detection signal detection_sig. As such, the check signal generator 730 produces a check signal ck_for_idle_clk, which is fed to the multiplexer 726 for ensuring that the disable signal disable_sig is sent during a full sample counter cycle after the comparison output cmp_out is asserted. The essential function of this disable circuit 220 is to generate a resetting signal when it is detected that CLK1 is no longer active.

Figure 8:
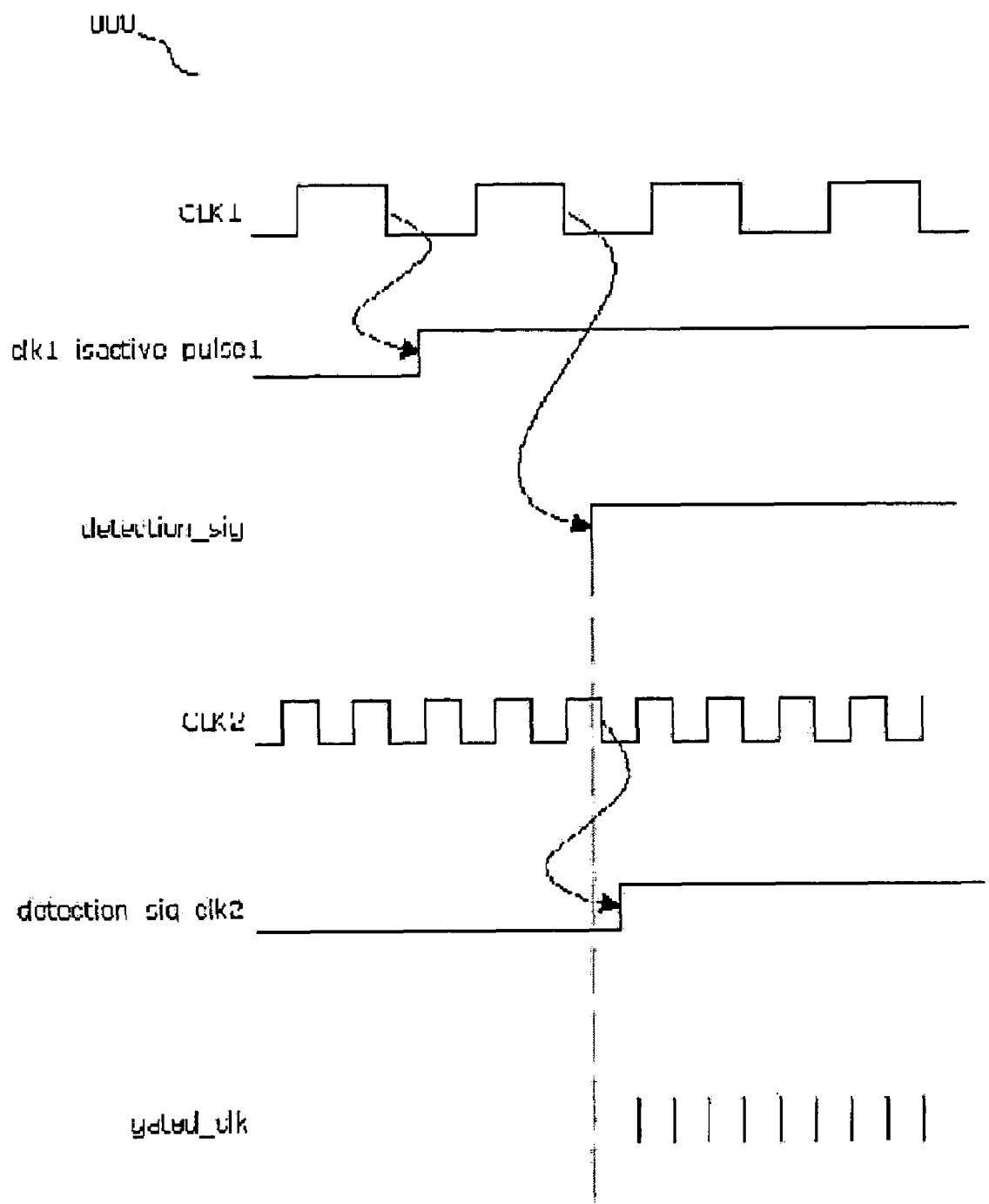
FIG. 8 presents a timing diagram showing the generation of a detection signal and a gated clock signal.

FIG. 8 presents a timing diagram 800 showing the generation of the detection signal detection_sig and the gated clock signal gated_clk. When the first clock CLK1 is active, the first falling edge sets clk1_isactive_pulsel to "1". In addition, the second falling edge sets detection_sig to "1". The detection signal detection_sig is synchronized with the second clock CLK2, producing a detection signal detection_sig_clk2 that is synchronized with the second clock CLK2. The gated clock signal is then produced after passing detection_sig_clk2 and the second clock CLK2 through the AND gate.

Figure 9:
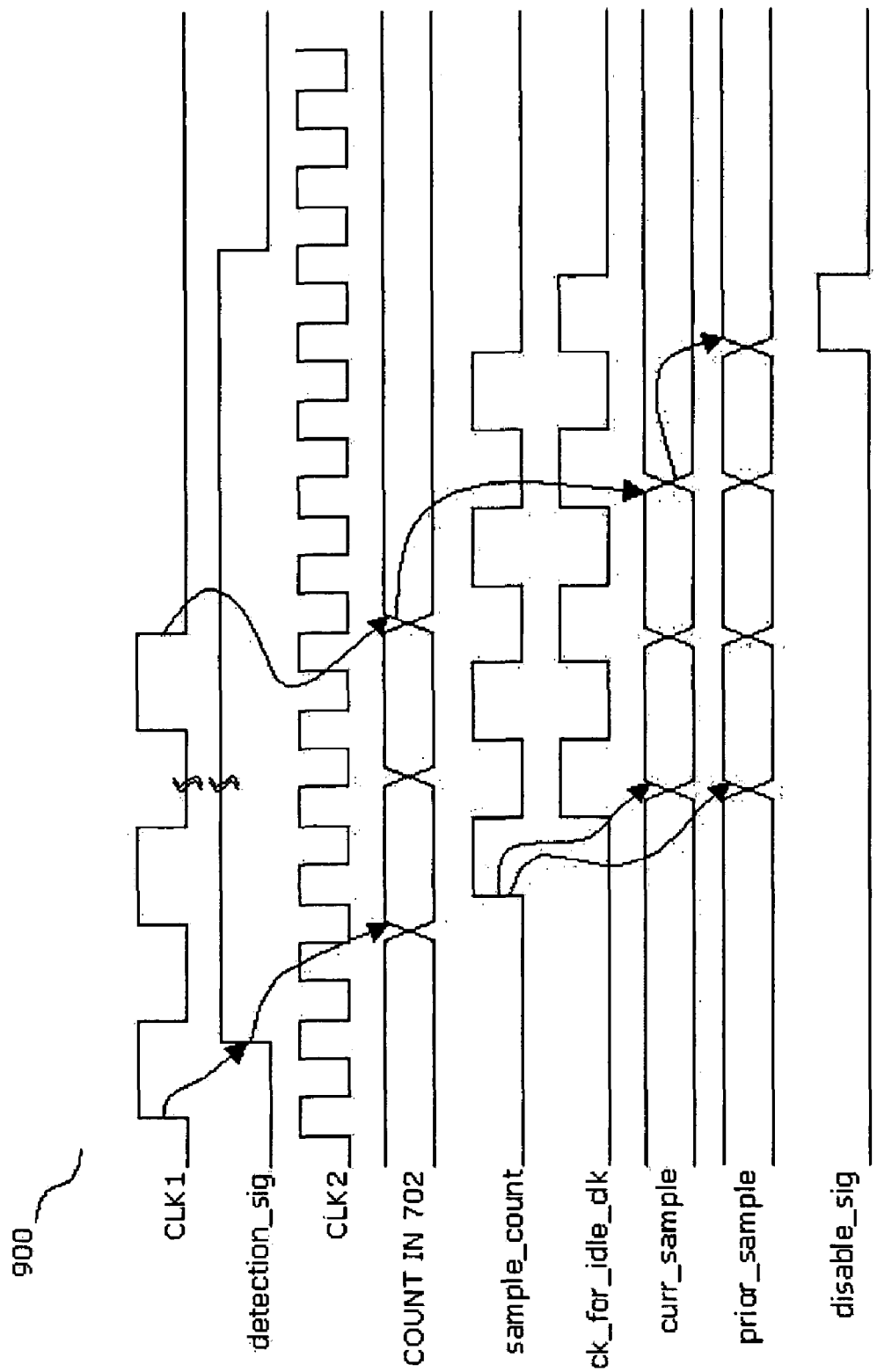
FIG. 9 presents a timing diagram showing the generation of a checking signal and a disable signal.

FIG. 9 presents a timing diagram 900 showing the generation of the disable signal disable_sig. As the various tracking arrows point out, when the detection signal detection_sig is active, the counter 702 starts counting. The current and prior samples are generated and compared against each other. If the two signals are the same, the disable signal disable_sig becomes active, thereby resetting detection_sig in the detection circuit to inactive.

Figure 10:
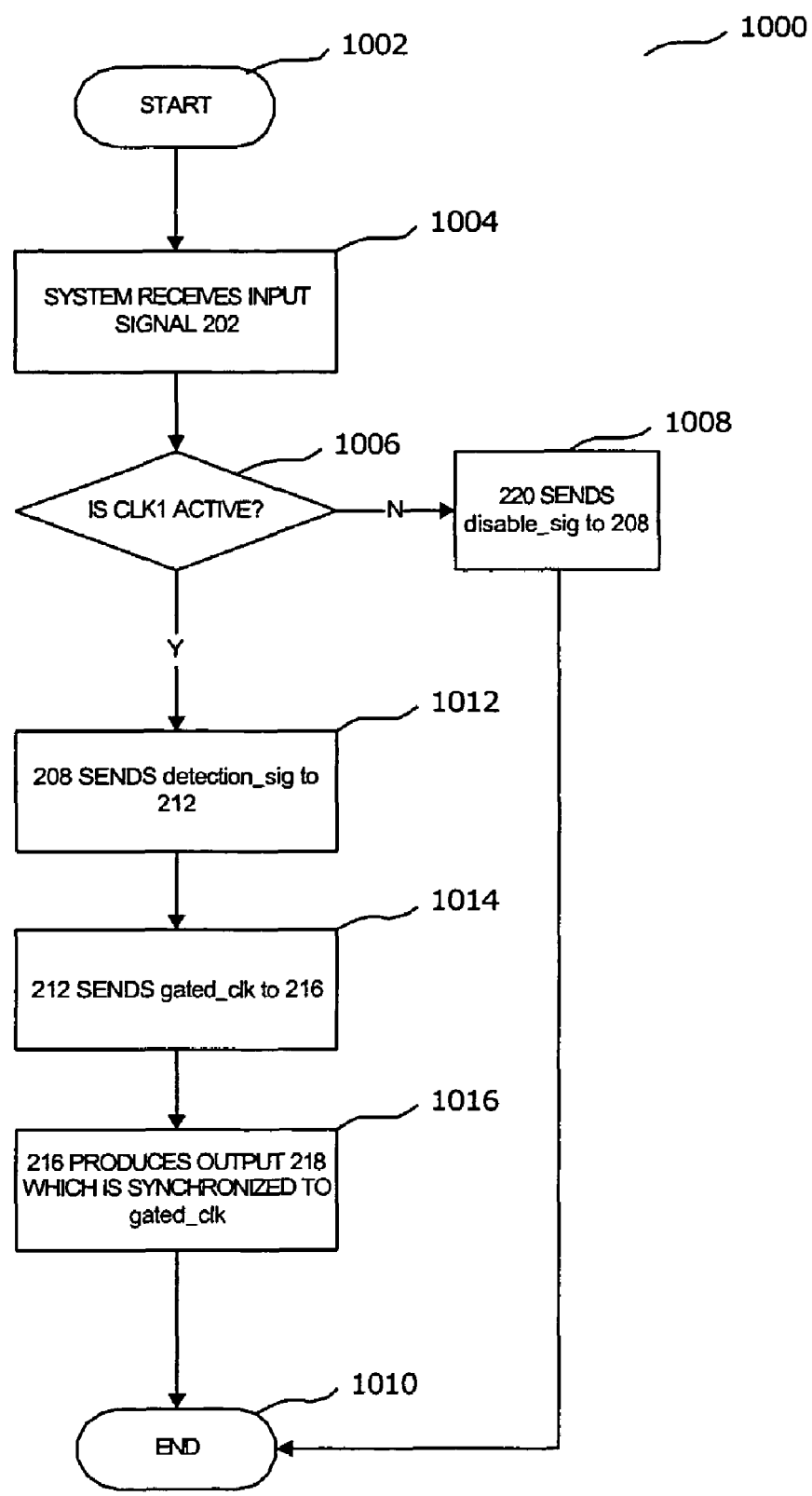
FIG. 10 presents a flowchart showing a process for deactivating the synchronization when the first clock is inactive according to the present disclosure.

FIG. 10 presents a flowchart 1000 showing steps for synchronizing the signals in two clock domains as implemented according to the present disclosure. Starting at a begin block 1002, the logic proceeds to a process block 1004, wherein the system receives the input signal. When the system receives an input signal, the logic proceeds to a decision block 1006, which determines whether the first clock is active. If the first clock is inactive, the logic proceeds to a process block 1008, wherein the system's disable circuit sends a disable signal to the detection circuit, thereby deactivating the rest of the circuitry that synchronizes signals from the first clock domain to the second clock domain. The logic then proceeds to an end block 1010. If the first clock is active, the logic proceeds to a process block 1012, wherein the system's detection circuit sends a valid detection signal to the gated clock module. The logic then proceeds to a process block 1014, wherein the gated clock module receives the valid detection signal and sends the gated signal to the output selection module. The logic then proceeds to a process block 1016, wherein the output selection module receives the gated signal and synchronizes the signal from the first clock domain therewith. The logic then proceeds to the end block 1010. As illustrated above, the synchronizing circuit described by the present disclosure prohibits the signals to be synchronized with the second clock when the first clock is detected to be inactive, thereby reducing power consumption for the circuit.

The above disclosure provides several different embodiments, or examples, for implementing different features of the disclosure. Also, specific examples of components, and processes are described to help clarify the disclosure. These are, of course, merely examples and are not intended to limit the disclosure from that described in the claims.

While the disclosure has been particularly shown and described with reference to the preferred embodiment thereof, it will be understood by those skilled in the art that various changes in form and detail may be made therein without departing from the spirit and scope of the disclosure.

What is claimed is:

1. A signal synchronizing circuit for prohibiting signals traveling from a first clock domain operating with a first clock to a second clock domain operating with a second clock when the first clock is not active, the synchronizing circuit comprising:
    at least one signal receiving module for receiving at least one selected signal in the first clock domain;
    a detection circuit producing a detection signal indicating that the first clock is active; and
    at least one output selection module for passing the selected signal from the first clock domain to the second clock domain only when the detection signal indicating that the first clock is active.

2. The circuit of claim 1 wherein the signal receiving module includes a flip-flop receiving the selected signal upon a triggering of the first clock.

3. A signal synchronizing circuit for prohibiting signals traveling from a first clock domain operating with a first clock to a second clock domain operating with a second clock when the first clock is not active, the synchronizing circuit comprising:
    at least one signal receiving module for receiving at least one selected signal in the first clock domain;
    a detection circuit producing a detection signal indicating that the first clock is active; and
    at least one output selection module for passing the selected signal from the first clock domain to the second clock domain only when the detection signal indicating that the first clock is active,
    wherein the output selection module includes a first flip-flop receiving the selected signal from the first clock domain upon a triggering of a gated clock generated by a gated clock module.

4. The circuit of claim 3 wherein the gated clock module further includes:
    a second flip-flop receiving the detection signal upon a triggering of the second clock; and
    an AND gate passing the output of the flip-flop to generate the gated clock when the second clock is active.

5. The circuit of claim 3 wherein the detection circuit further includes two or more flip-flops arranged in series that are synchronized with the first clock.

6. The circuit of claim 5 wherein the flip-flops have a constant value for their inputs and the first clock as their clock inputs.

7. The circuit of claim 5 wherein the detection circuit further includes at least one flip-flop synchronized with the second clock and connected in series with the flip-flop generating the detection signal.

8. The circuit of claim 3 further comprising a disable circuit for disabling the detection signal when the first clock becomes inactive.

9. The circuit of claim 8 wherein the disable circuit further includes:
    a counter for receiving the detection signal as its input when triggered by the first clock to generate a counter output;
    a first multiplexer based sample circuit generating a first sample of the counter output in the second clock domain;
    a second multiplexer based sample circuit generating a second sample of the counter output in the second clock domain;
    a comparison module for comparing whether the first and second samples are the same; and
    a third multiplexer based sample circuit for generating a disable signal when the first and second samples are the same.

10. The circuit of claim 9 wherein the first and second multiplexer based sample circuits generate the first and second samples upon a sample triggering signal at a predetermined time for preventing inadvertently disabling the detection signal.

11. The circuit of claim 10 wherein the disable circuit further includes a check signal asserted for a full second clock after the sample triggering signal is asserted.

12. A signal synchronizing circuit for allowing signals traveling from a first clock domain operating with a first clock to a second clock domain operating with a second clock, the circuit comprising:
    a detection circuit producing a detection signal indicating that the first clock is active; and
    a signal synchronization module that allows at least one selected input signal to pass from the first clock domain to the second clock domain when the first clock is active, the signal synchronization module further comprising:
    a first latch synchronizing the detection signal with the second clock;
    a signal passing module passing the output of the first latch to generate a gated clock signal that is synchronized with the second clock; and
    an output selection module for passing the selected input signal upon a triggering of the gated clock signal.

13. The circuit of claim 12 wherein the detection further includes two or more flip-flops arranged in series that are synchronized with the first clock.

14. The circuit of claim 13 wherein the flip-flops have a constant value for their inputs and the first clock as their clock inputs.

15. The circuit of claim 12 wherein the signal passing module is an AND gate.

16. The circuit of claim 12 further comprising a disable circuit for disabling the detection signal when the first clock is detected as being inactive.

17. The circuit of claim 16 wherein the disable circuit further includes:

a counter for receiving the detection signal as its input when triggered by the first clock to generate a counter output;

a first multiplexer based sample circuit generating a first sample of the counter output in the second clock domain;

a second multiplexer based sample circuit generating a second sample of the counter output in the second clock domain;

a comparison module for comparing whether the first and second samples are the same; and a third multiplexer based sample circuit for generating a disable signal when the first and second samples are the same.

18. The circuit of claim 17 wherein the first and second multiplexer based sample circuits generate the first and second samples upon a sample triggering signal at a predetermined time for preventing inadvertently disabling the detection signal.

19. The circuit of claim 18 wherein the disable circuit further includes a check signal asserted for a full second clock after the sample triggering signal is asserted.

20. A method for prohibiting signals traveling from a first clock domain operating with a first clock to a second clock domain operating with a second clock to be synchronized with the second clock when the first clock is inactive, the method comprising:

receiving at least one selected signal in the first clock domain;

detecting the first clock for generating a detection signal indicating that the first clock is inactive; and prohibiting the selected signal from the first clock domain to be synchronized with the second clock when the detection signal indicating that the first clock is detected to be inactive.

21. The method of claim 20 wherein the receiving further includes receiving the selected signal upon a triggering of the first clock using a flip-flop.

22. A method for prohibiting signals traveling from a first clock domain operating with a first clock to a second clock domain operating with a second clock to be synchronized with the second clock when the first clock is inactive, the method comprising:

receiving at least one selected signal in the first clock domain;

detecting the first clock for generating a detection signal indicating that the first clock is inactive; and prohibiting the selected signal from the first clock domain to be synchronized with the second clock when the detection signal indicating that the first clock is detected to be inactive, wherein the prohibiting further includes generating a gated clock signal that prohibits the operation of at least one output selection circuit that receives the selected signal.

23. The method of claim 22 further includes:

synchronizing the detection signal with the second clock; and passing the synchronized detection signal to generate the gated clock when the second clock is active.

24. The method of claim 22 wherein the detecting further includes detecting whether the first clock is inactive by feeding a constant input to at least one flip-flop that is synchronized with the first clock.

25. The method of claim 22 further comprising disabling the detection signal when the first clock becomes inactive.

26. The method of claim 25 wherein the disabling further includes:

receiving the detection signal as an input of a counter when triggered by the first clock to generate a counter output;

generating a first sample of the counter output by a first multiplexer based sample circuit in the second clock domain;

generating second sample of the counter output by a second multiplexer based sample circuit in the second clock domain;

comparing whether the first and second samples are the same; and generating a disable signal by a third multiplexer based sample circuit when the first and second samples are the same.

27. The method of claim 26 wherein the first and second multiplexer based sample circuits generate the first and second samples upon a sample triggering signal at a predetermined time for preventing inadvertently disabling the detection signal.

28. The method of claim 27 further includes asserting a check signal for a full second clock after the sample triggering signal is asserted.

* * * * *